United States Patent
Cheng et al.

(10) Patent No.: US 9,907,113 B2
(45) Date of Patent: Feb. 27, 2018

(54) EFFICIENCY OF WIRELESS WIDE AREA NETWORKS UTILIZING LOCAL WIRELESS CONNECTIONS

(75) Inventors: Marco Y. C. Cheng, Villa Park, CA (US); Huan-Yu Su, Irvine, CA (US); James W. Johnston, Rancho Santa Margarita, CA (US)

(73) Assignee: INTEL CORPORATION, Santa Clara, CA (US)

(*) Notice: Subject to any disclaimer, the term of this patent is extended or adjusted under 35 U.S.C. 154(b) by 916 days.

(21) Appl. No.: 13/468,978

(22) Filed: May 10, 2012

(65) Prior Publication Data

US 2013/0267270 A1 Oct. 10, 2013

Related U.S. Application Data

(60) Provisional application No. 61/621,395, filed on Apr. 6, 2012.

(51) Int. Cl.
*H04B 7/00* (2006.01)
*H04W 84/00* (2009.01)
(Continued)

(52) U.S. Cl.
CPC ..... *H04W 84/005* (2013.01); *H04W 52/0219* (2013.01); *H04W 52/0245* (2013.01); *H04W 28/06* (2013.01); *H04W 76/022* (2013.01); *H04W 88/04* (2013.01); *H04W 92/18* (2013.01); *Y02B 60/50* (2013.01)

(58) Field of Classification Search
CPC . H04W 88/04; H04W 48/00; H04W 52/0219; H04W 40/02; H04W 40/16; H04W 40/22; H04W 52/0245; H04W 74/08; H04W 92/18; H04W 88/08
See application file for complete search history.

(56) References Cited

U.S. PATENT DOCUMENTS 9,036,509 B1 * 5/2015 Addepalli ............ H04W 4/046
370/259
2002/0187746 A1 12/2002 Cheng
(Continued)

FOREIGN PATENT DOCUMENTS

| EP | 1 545 076 | 6/2005 |
|---|---|---|
| WO | WO 2009/112080 | 9/2009 |
| WO | WO 2011/153507 | 12/2011 |

*Primary Examiner* — Ankur Jain
(74) *Attorney, Agent, or Firm* — Viering, Jentschura & Partner mbB

(57) ABSTRACT

Provided is a system for wireless communications including several base stations supporting a wide area wireless network and several mobile user equipment (UE) devices. Each mobile UE device may be configured to transmit a request to establish a local wireless connection with one or more of the UE devices. The mobile UE device may receive a response containing connectivity information from each of the mobile UE devices and then select one of the mobile UE devices based on the connectivity information received from each of the mobile UE devices. The mobile UE device may then establish a local wireless connection with the selected mobile UE device. The mobile UE device may then communicate with one of the base stations in the wide area wireless network through the selected mobile UE device, utilizing the local wireless connection.

6 Claims, 5 Drawing Sheets

(51) Int. Cl.
*H04W 52/02* (2009.01)
*H04W 88/04* (2009.01)
*H04W 28/06* (2009.01)
*H04W 92/18* (2009.01)
*H04W 76/02* (2009.01)

(56) References Cited

U.S. PATENT DOCUMENTS

| | | | |
|---|---|---|---|
| 2004/0033778 A1* | 2/2004 | Fonseca et al. | 455/11.1 |
| 2005/0009524 A1* | 1/2005 | Garani | H04B 7/2606 455/445 |
| 2008/0042912 A1* | 2/2008 | Lee | 343/713 |
| 2008/0085702 A1* | 4/2008 | Park et al. | 455/422.1 |
| 2013/0070751 A1* | 3/2013 | Atwal | H04W 56/001 370/350 |
| 2013/0084828 A1* | 4/2013 | Forte | 455/410 |

* cited by examiner

EFFICIENCY OF WIRELESS WIDE AREA NETWORKS UTILIZING LOCAL WIRELESS CONNECTIONS

RELATED APPLICATIONS

This application claims priority to U.S. Provisional Application No. 61/621,395, filed on Apr. 6, 2012, which is hereby incorporated by reference in its entirety.

BACKGROUND

As the speed, complexity and functionality of mobile user equipment (UE) devices continue to increase, fluctuations in the signal strength or unavailability of the wide area wireless networks which support the mobile UE devices unacceptably limit the quality of wireless connections to users. For example, when a mobile UE device, such as a wireless smart phone, experiences poor signal quality, a user is typically required to change locations in order to restore a wireless connection to the network. Such sporadic wireless network coverage unacceptably limits the availability of bandwidth to individual mobile UE devices. To provide adequate wireless network coverage, service providers are required to build base stations and transmitting towers in the poor coverage areas, which can be prohibitively expensive.

Conversely, in densely populated areas, hundreds or thousands of mobile UE devices may compete for a limited amount of bandwidth on overcrowded wireless networks. Interference between the mobile UE devices in these areas can decrease the average efficiency of bandwidth usage to levels as low as 25%. Such decreased communication efficiencies can quickly drain the batteries of mobile UE devices which are forced to re-transmit and re-receive data during such periods of high network interference.

SUMMARY

The present application is directed to improving the efficiency of wireless wide area networks utilizing local wireless connections, substantially as shown in and/or described in connection with at least one of the figures, and as set forth more completely in the claims.

DETAILED DESCRIPTION

Figure 1A:
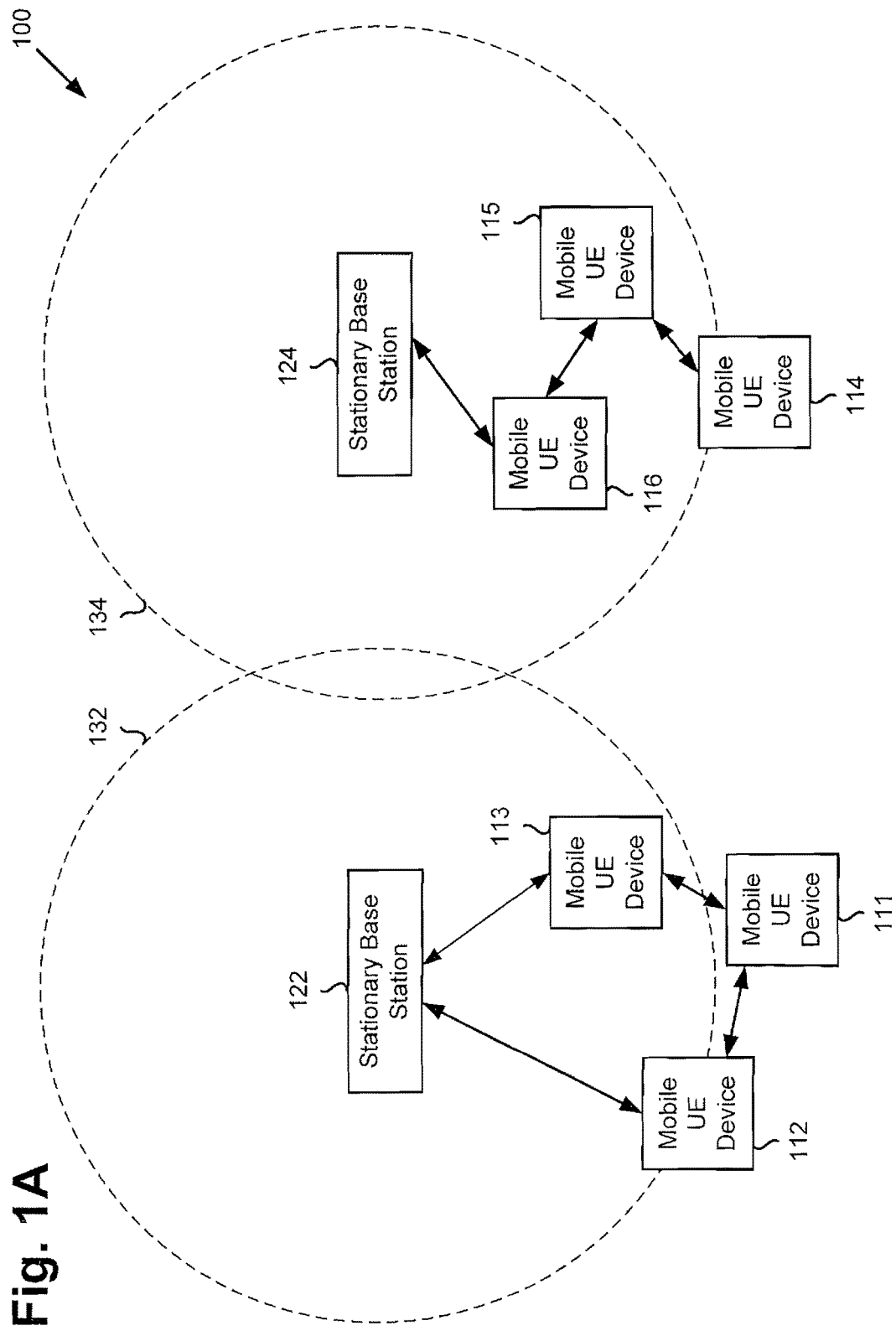
FIG. 1A presents an exemplary diagram of a system for wireless communications, in accordance with one implementation of the present application.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1A illustrates an exemplary diagram of a system 100 for wireless communications, according to one implementation of the present application. System 100 may represent a wide area wireless network and may include several stationary base stations and several mobile user equipment (UE) devices, which may be connected to the wide area wireless network through one or more of the stationary base stations. For example, FIG. 1A includes stationary base station 122 and stationary base station 124. Each of stationary base stations 122 and 124, for example, may provide wireless communications on the wide area wireless network using the same service provider. In the alternative, each of stationary base stations 122 and 124 may provide wireless communications on the wide area wireless network using a different service provider. Examples of service providers may include, without limitation, Verizon Wireless, AT&T, Sprint, Cricket Wireless, T-Mobile, Boost Mobile, Virgin Mobile, US Cellular, Metro PCS or any other wireless communications service provider. Each stationary base station may be associated with a coverage area within which that stationary base station may communicate with other associated electronic devices. For example, coverage area 132 may correspond to stationary base station 122, while coverage area 134 may correspond to stationary base station 124.

System 100 may also include several mobile UE devices, for example, mobile UE devices 111-116. Each of mobile UE devices 111-116 may be any type of wireless device, for example, a smart phone, a gaining console, a tablet computer, a laptop, a personal computer (PC) or a personal digital assistant (PDA). However, any of mobile UE devices 111-116 may be any other electronic device capable of wireless communication and are not limited to the above examples.

In conventional wide area wireless networks, a mobile UE device will typically connect to the wide area wireless network via direct communication between the mobile UE device and a stationary base station. Thus, any user of a mobile UE device is limited by the signal strength of a nearby stationary base station at any given location within the coverage area of that stationary base station. However, in one implementation of the present application, according to FIG. 1A, each of mobile UE devices 111-116 may be configured to collaboratively form a local wireless connection with one or more of the other mobile UE devices, and communicate with a stationary base station through the local wireless connection. Such a local wireless connection may include communication protocols such as bluetooth, wifi, zigbee, near field communication, 2G, 3G, 4G, 5G, LTE and/or LTE advanced, for example. However, such a local wireless connection may be formed utilizing any other wireless communication protocol and is not limited to the above examples.

Figure 2:
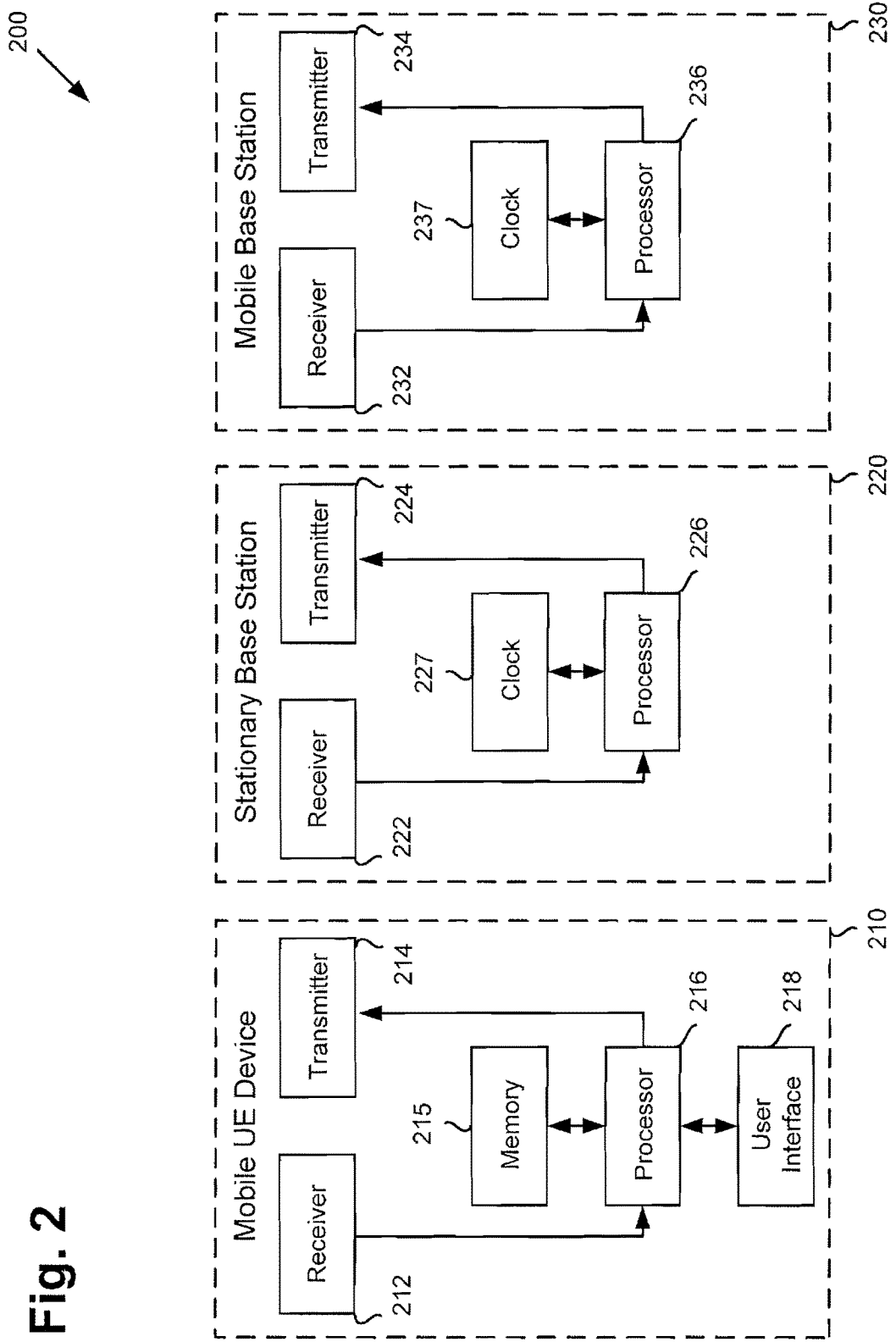
FIG. 2 presents one or more exemplary devices that may be utilized in a system for wireless communications, in accordance with one implementation of the present application.
Figure 3:
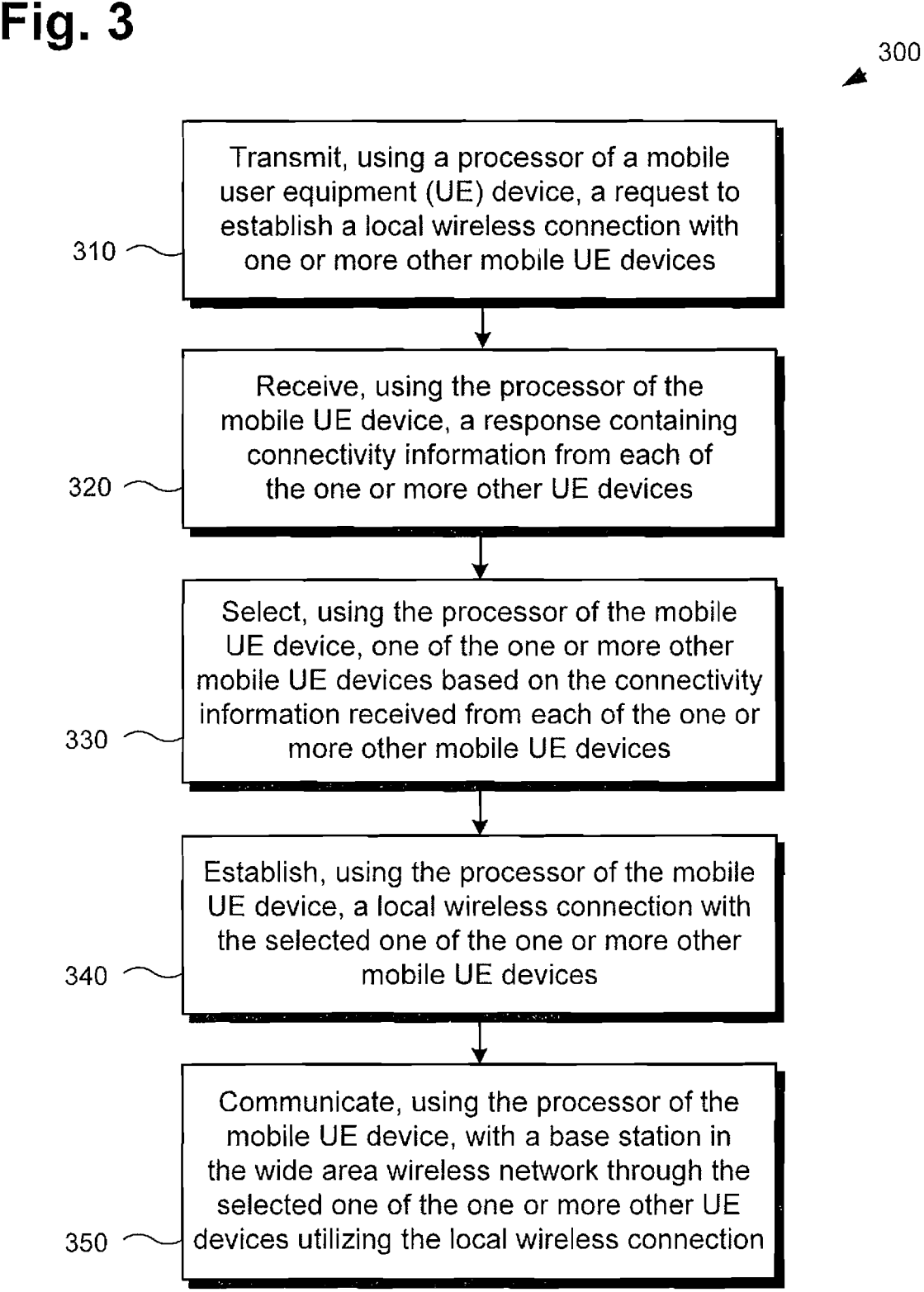
FIG. 3 presents an exemplary flowchart describing a method for wireless communications in a wireless wide area network, in accordance with one implementation of the present application.

The operation of system 100 of FIG. 1A, according to one implementation of the present application, will now be described with additional reference to FIGS. 2 and 3. FIG. 2 presents one or more exemplary devices that may be utilized in a system for wireless communications, according to one ore more implementations of the present application. Any numerals disclosed herein in the 200s correspond to FIG. 2. FIG. 3 illustrates an exemplary flowchart describing a method for wireless communications in a wireless wide area network, according to one implementation of the present application.

Regarding the operation of system 100 of FIG. 1A, FIG. 2 may include an exemplary mobile UE device 210 and an exemplary stationary base station 220. Each of mobile UE devices 111-116 may correspond to mobile UE device 210 of FIG. 2, for example. As shown in FIG. 2, mobile UE device 210 may include receiver 212 connected to processor 216 which, in cooperation with processor 216, may be configured to receive communications from one or more electronic devices on a wireless wide area network, according to one or more implementations of the present application. Mobile UE device 210 may also include transmitter 214 connected to processor 216, which, in cooperation with processor 216, may be configured to transmit communications to one or more other electronic devices on the wireless wide area network, according to one or more implementations of the present application. Memory 215 may be connected to processor 216, for example, and may be configured to store any and all data as required by one or more implementations of the present application. Finally, user interface 218 may be connected to processor 218 and may be configured to display any and all information as required by one or more implementations of the present application.

FIG. 2 also includes an exemplary stationary base station 220, which may correspond to each of stationary base stations 122, 124 and 126 of FIGS. 1A and/or 1B, for example. As shown in FIG. 2, stationary base station 220 may include receiver 222 connected to processor 226 which, in cooperation with processor 226, may be configured to receive communications from one or more electronic devices on a wireless wide area network, according to one or more implementations of the present application. Stationary base station 220 may also include transmitter 224 connected to processor 226 which, in cooperation with processor 226, may be configured to transmit communications to one or more other electronic devices on the wireless wide area network, according to one or more implementations of the present application. Clock 227 may be connected to processor 226, for example, and may be configured to provide a master timing signal for controlling communications between the stationary base station and other electronic devices on the wireless wide area network, such as mobile UE device 210 for example, as required by one or more implementations of the present application. Mobile base station 230 may include receiver 232, transmitter 234, clock 237, and processor 236 and may be configured substantially as stationary base station 220 with the exception that clock 237 of mobile base station 230 is configured to provide a master timing signal for controlling wireless communications between the mobile base station and other electronic devices on the wireless wide area network, such as mobile UE device 210 for example, while in motion.

Turning, again, to system 100 of FIG. 1A, mobile UE device 111 is shown outside coverage area 132 of stationary base station 122. Mobile UE devices 112 and 113 are shown inside coverage area 132, where mobile UE device 112 is shown on the edge of coverage area 132 and mobile UE device 113 is shown well within coverage area 132. Mobile UE device 113 may experience a high signal strength with stationary base station 122, for example. Thus, mobile UE device 113 may communicate directly with stationary base station 122. Because mobile UE device 112 is on the edge of coverage area 132, mobile UE device 112 may experience a lower signal strength than mobile UE device 113, but may also communicate directly with stationary base station 122. On the other hand, because mobile UE device 111 is outside of coverage area 132, the signal strength with stationary base station 122 may be too weak for mobile UE device 111 to communicate with stationary base station 122 directly. However, because mobile UE device 111 is in close proximity with both mobile UE devices 112 and 113, mobile UE device 111 may establish a local wireless connection with either of mobile UE devices 112 or 113. Once a local wireless connection is established, mobile UE device 112 or 113 may then act as a relay for communications between mobile UE device 111 and stationary base station 122.

Flowchart 300 of FIG. 3 describes a method for such wireless communications in a wireless wide area network. Action 310 of flowchart 300 includes transmitting, using a processor of a mobile UE device, a request to establish a local wireless connection with one or more other mobile UE devices. In FIG. 1A, mobile UE device 111 may transmit a request to establish a local wireless connection with mobile UE device 112 and/or mobile UE device 113.

Continuing to action 320 of flowchart 300, action 320 includes receiving, using the processor of the UE device, a response containing connectivity information from each of the one or more other UE devices. In FIG. 1A, mobile UE device 111 may receive a response from each of mobile UE devices 112 and 113 including connectivity information. Such connectivity information may include a remaining battery charge, a signal strength with stationary base station 122, an identity of the associated service provider, or a type of local wireless connection available, from each of each of mobile UE devices 112 and 113.

Action 330 includes selecting, using the processor of the mobile UE device, one of the one or more other mobile UE devices based on the connectivity information received from each of the one or more other mobile UE devices. For example, in FIG. 1A, mobile UE device 111 may establish the local wireless connection with whichever of mobile UE devices 112 and 113 is currently experiencing the highest signal strength with stationary base station 122. In the alternative, mobile UE device 111 may establish the local wireless connection with whichever of mobile UE devices 112 and 113 has the highest remaining battery charge, for example, to extend the battery life of the mobile UE device network as a whole. In yet another alternative, mobile UE device 111 may establish the local wireless connection with whichever of mobile UE devices 112 and 113 has a type of local wireless network connection available having the lowest power cost of transmission. For example, mobile UE device 112 may have a bluetooth connection available for a potential local wireless connection while mobile UE device 113 may have a wifi connection available for a potential local wireless connection. If communicating between mobile UE device 111 and mobile UE device 112, using the local wifi connection, would require less power than the local bluetooth connection, mobile UE device 111 may establish the local network wifi connection with mobile UE device 113 to extend battery life. Accordingly, action 340 of flowchart 300 includes establishing, using the processor of the mobile UE device, a local wireless connection with the selected one of the one or more other mobile UE devices.

Finally, action 350 of flowchart 300 includes communicating, using the processor of the mobile UE device, with a base station in the wide area wireless network through the selected one of the one or more other UE devices utilizing the local wireless connection. In FIG. 1A, once a local wireless connection is established between mobile UE device and either of mobile UE devices 112 or 113, mobile UE device 111 may communicate with stationary base station 122 through the established local wireless connection.

However, the present inventive concepts are not limited to a single local wireless connection. Thus, as in the example above, a local wireless connection may be established between mobile UE devices 111 and 112 via bluetooth, and between mobile UE devices 111 and 113 via wifi, for example. In such an implementation, mobile UE devices 111-113 may work together in an actively collaborative manner to effectively create a multi-antenna, multi-stream transmission network. This allows a data "pay-load" from mobile UE device 111, for example, to be broken up and transmitted to base station 122 through multiple communication channels simultaneously. In such an implementation, a transmission may be broken up at the transmitting mobile UE device, for example mobile UE device 111, and reassembled at the receiving base station, for example stationary base station 122. Thus, such an implementation not only effectively enlarges the coverage area of base station 122, for example, but also effectively increases the bandwidth available for communications.

In the above examples, mobile UE device 111 is located outside of coverage area 132. However, a mobile UE device is not required to be located outside of the coverage area of a stationary base station in order to establish a local wireless network for relaying communications. For example, FIG. 1A shows stationary base station 124, having coverage area 134, where each of mobile UE devices 114-116 may be located within coverage area 134. Mobile UE device 116 may have a high strength signal with stationary base station 124, while mobile UE devices 115 and 114 may have a medium strength signal and a low strength signal, respectively, for example.

Because each of mobile UE devices 114-116 are located within coverage area 134, each may establish a direct wireless connection with stationary base station 124. However, there are several reasons why this may not be the most desirable option. For example, if the charge on the battery of mobile UE device 114 is low high-power broadcasting directly to stationary base station 124 may cause the battery to discharge too quickly, especially if high levels of interference are present, requiring the re-receiving and re-transmitting of data. In such an example, a lower power broadcasting method, such as a local wireless connection between mobile UE device 114 and mobile UE device 115, for example, may extend the battery life of mobile UE device 114. In addition, utilizing local wireless connections between mobile UE devices 114 and 115 and between mobile UE devices 115 and 116 may reduce the interference which may result from 3 separate high-power broadcasting channels directly to stationary base station 124. This may be especially true where the number of mobile UE devices is much larger than 3. Another reason why it may be desirable for a UE device, such as UE device 114, to establish a local wireless connection with UE device 115 is where UE device 114 does not have a subscription to either of the carriers providing service through stationary base stations 124 or 126 but UE device 115 does, for example. In such a situation, UE device 114 may establish a local wireless connection with UE device 115 in order to obtain service where UE device 114 would otherwise be unable.

Another benefit of the present inventive concepts is improved communication efficiency. For example, bandwidth and power usage efficiency in certain wide area wireless networks may be as low as 25% due to interference and other factors. However, where several mobile UE devices establish local wireless connections with a single mobile UE device, communications from each of the connected mobile UE devices may be more efficiently arranged into a single high-powered broadcast channel to the base station.

Figure 1B:
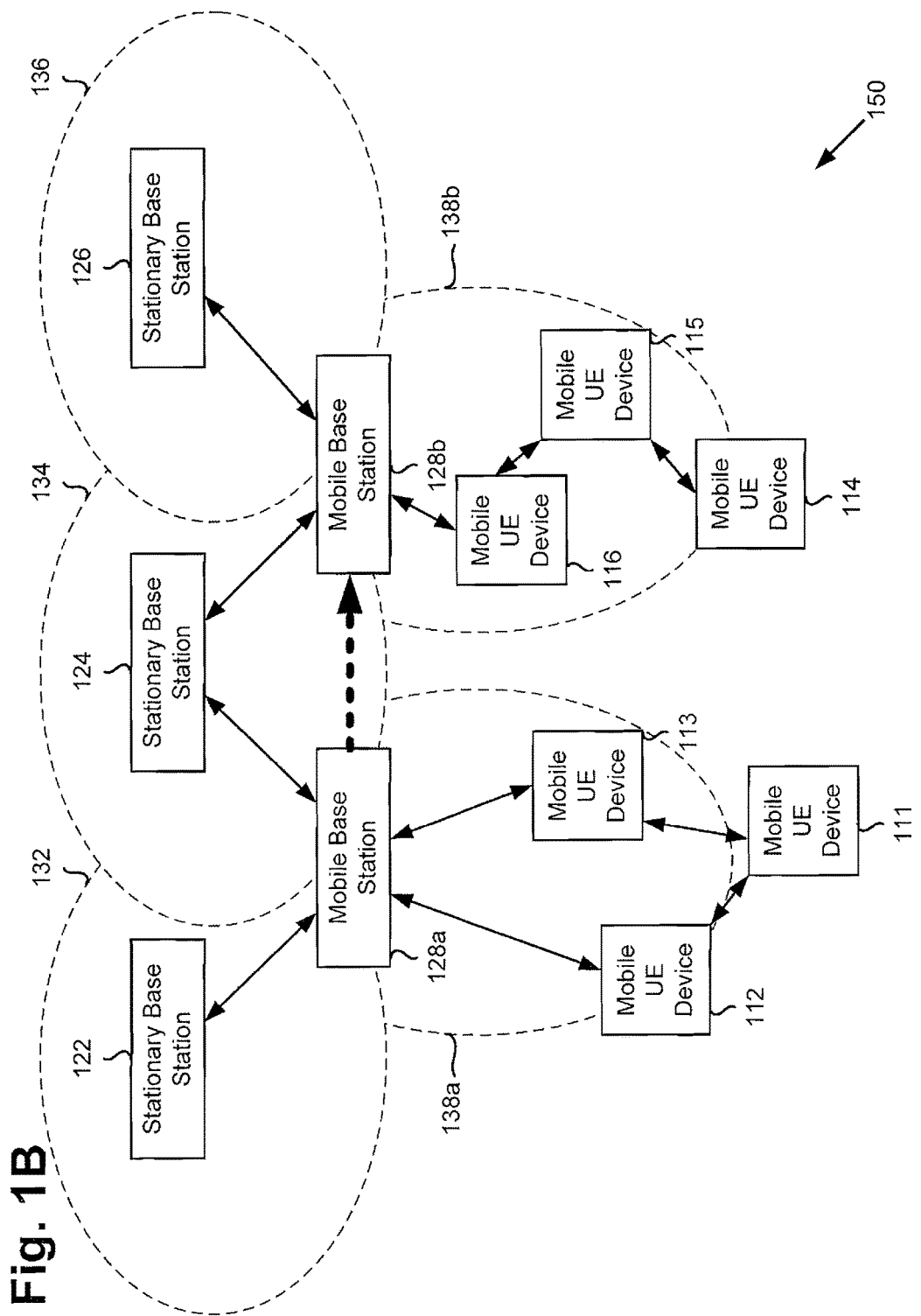
FIG. 1B presents an exemplary diagram of another system for wireless communications, in accordance with one implementation of the present application.

Turning to FIG. 1B, FIG. 1B illustrates another system for wireless communications, according to one implementation of the present application. Specifically, FIG. 1B illustrates system 150 which may represent a wireless wide area network including mobile UE devices 111-116 and stationary base stations 122 and 124, similar to FIG. 1A. However, system 150 may additionally include stationary base station 126 and a mobile base station. For the purpose of illustration, mobile base station 128a may represent the location of the mobile base station in a first position, relative to coverage areas 132, 134 and 136 of stationary base stations 122, 124 and 126, respectively. Similarly, mobile base station 128b may represent the location of the same mobile base station in a second position, relative to the same coverage areas, after physical motion has taken place. For the sake of brevity, mobile UE devices 111-116 may have the same relationships to one another as described above with regard to FIG. 1A. Moreover, the operation of mobile UE devices 111-116 in FIG. 1B may be substantially the same as that discussed above regarding FIGS. 1A and 3, with the exception that any high-powered broadcast may take place between one or more of mobile UE devices 111-116 and mobile base station 128a or 128b, rather than stationary base station 122 or 124, respectively.

Mobile base station 128a may have coverage area 138a in the first position, while mobile base station 128b may have coverage area 138b in the second position. The heavy arrow between mobile base station 128a and 128b may indicate an arbitrary direction of travel of the mobile base station from the first position to the second position with respect to stationary base stations 122, 124 and 126 and their respective coverage areas. Exemplary applications in which a mobile base station, such as mobile base station 128a and 128b, may be utilized may include public transportation vehicles such as buses, planes or trains. However, implementations are not limited to such applications and may be used in any appropriate application in which it is advantageous for a base station to be mobile.

For the purpose of FIG. 1B, each of mobile UE devices 111-116 may correspond to mobile UE device 210 of FIG. 2, as stated above regarding FIG. 1A. Likewise stationary base stations 122, 124 and 126 may each correspond to stationary base station 220 of FIG. 2, for example. Similarly, mobile base station 128a and 128b may correspond to mobile base station 230 of FIG. 2, In another implementation, a mobile UE device, such as one or more of mobile UE devices 111-116 may function as a mobile base station. In such a situation, any functionality ascribed to a mobile base station may be inherent in that particular mobile UE device functioning as a mobile base station.

Figure 4:
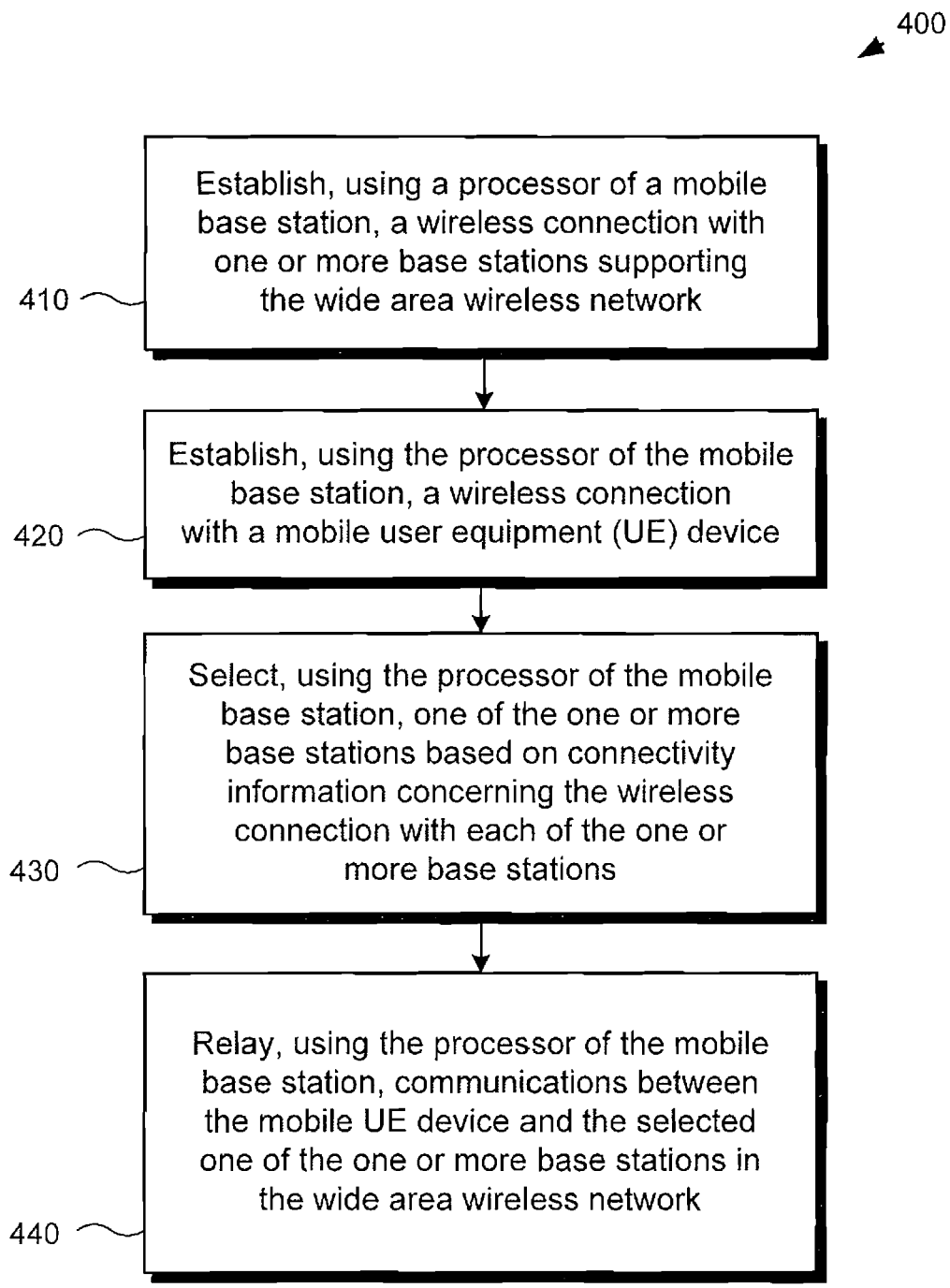
FIG. 4 presents an exemplary flowchart describing another method for wireless communications in a wireless wide area network, in accordance with one implementation of the present application.

Flowchart 400 of FIG. 4 describes a method for establishing such wireless communications utilizing a mobile base station in a wireless wide area network. Action 410 of flowchart 400 includes establishing, using a processor of a mobile base station, a wireless connection with one or more base stations supporting the wide area wireless network. As shown in FIG. 1B, mobile base station 128a is within coverage areas 132 and 134 of stationary base stations 122 and 124, respectively. Thus, mobile base station 128a may establish a wireless connection with stationary base stations 122 and 124. Preferably, each stationary base station may provide wireless communications in the wide area wireless network using a different service provider. However, each stationary base station may alternatively utilize the same service provider. Thus, where each stationary base station uses a different service provider, mobile base station 128*a* and 128*b* may be configured to provide connection to the wide area wireless network through as many service providers as are supported by the stationary base stations and are subscribed to by mobile base station 128*a* and 128*b*.

Continuing with action 420, action 420 of flowchart 400 includes establishing, using the processor of the mobile base station, a wireless connection with a mobile UE device. In FIG. 1B, mobile base station 128*a* may establish a wireless connection with either of mobile UE devices 112 or 113, which are shown to be within coverage area 138*a* of mobile base station 128*a* at the first position. As stated above, the operation of mobile UE devices 111-113 may be substantially as described with respect to FIGS. 1A and 3 concerning establishing and communicating through local wireless connections.

Action 430 of flowchart 400 includes selecting, using the processor of the mobile base station, one of the one or more base stations based on connectivity information concerning the wireless connection with each of the one or more base stations. Such connectivity information may include, for example, the signal strength of each of stationary base stations 122 and 124. However, the connectivity information may also include the service provider identity associated with each of the stationary base stations 122 and 124, for example. Thus, a mobile base station may select a base station that currently has the highest signal strength, or which is associated with a desired service provider. Typically, a stationary base station using the service provider matching the service provider of a particular mobile UE device may be selected. However, a base station having the higher signal strength may be selected, regardless of the service provider identity, for example.

Action 440 of flowchart 400 includes relaying, using the processor of the mobile base station, communications between the mobile UE device and the selected one of the one or more base stations in the wide area wireless network. Regarding FIG. 1B, once the desired stationary base station is selected, mobile base station 128*a* may intelligently route communications between either or both of mobile UE devices 112 and 113 and, for example, stationary base station 122 utilizing the wireless connection between mobile base station 128*a* and either or both of mobile UE devices 112 and 113. As stated above, regarding FIG. 1A, if appropriate local wireless connections have been established between mobile UE devices 111 and 112 and/or between mobile UE devices 111 and 113, communications from mobile UE device 111 may also be relayed to mobile base station 128*a* through the respective local wireless connections.

Because the base station is mobile, it may move out of the coverage area of one stationary base station and may move into the coverage area of another stationary base station. For example, in FIG. 1B, in a second position, mobile base station 128*b* may move out of coverage area 132 of stationary base station 122 and into coverage area 136 of stationary base station 126. Similarly, some mobile UE devices may move out of the coverage area of the mobile base station while other mobile UE devices move into the coverage area of the mobile base station. For example, as mobile base station 128*b* moves to the second position, mobile UE devices 111, 112 and 113 are no longer in the mobile base station coverage area, shown now as coverage area 138*b*. However, mobile UE devices 114-116 are in coverage area 138*b*. Thus, mobile base station 128*b*, having coverage area 138*b*, may provide mobile UE devices 114-116 with a connection to the wide area network, each of mobile UE devices 114 and 115 utilizing one or more local wireless connections for communication with mobile UE device 116, for example. As the mobile base station moves into and out of particular stationary base stations' coverage areas, the actions of flowchart 400 may be repeated as needed to establish or reestablish wireless communications between one or more stationary base stations and one or more mobile UE devices through the mobile base station. Likewise, as mobile UE devices change locations, battery charges, or signal strengths with base stations, the actions of flowchart 300 may be repeated as needed to establish or reestablish local wireless connections between one or more mobile UE devices.

Several specific examples incorporating one or implementations of the present inventive concepts will now be described. A first example may include any location where a large number of people are present, such as at a football stadium. In such an example, there are potentially thousands of users, each having a mobile UE device, such as a cell phone for example. Where potentially hundreds of these individuals are sending and receiving communications simultaneously, interference levels may cause the efficiency of wide area network bandwidth usage to fall. This may additionally adversely affect the battery life of the mobile UE devices forced to re-transmit and re-receive communications under high levels of interference.

However, according to one implementation of the present inventive concepts, the cell phone of a requesting user having a low battery charge or experiencing low signal quality may transmit a request to establish a local wireless connection with one or more other cell phones in the vicinity. Any responding user's cell phone which is equipped to operate under the present inventive concepts would send a response containing connectivity information which may include the battery life remaining on that cell phone, the signal strength with a base station currently experienced by the cell phone, a type of local wireless connection available from that cell phone, and/or the service provider identity of that cell phone, for example. The requesting user's cell phone may then select and establish a local wireless connection with a responding user's cell phone based on a higher signal quality, lowest power requirement of the available local wireless connection, and/or a matching service provider, for example.

The requesting user's cell phone may then communicate with a base station in the wide area wireless network through the local wireless connection to the selected responding user's cell phone. In this way, the requesting user's cell phone may reduce its power consumption by using the lower power local wireless connection instead of broadcasting at high power directly to the base station. In addition, interference on the wide area network is reduced as only the responding user's cell phone is performing high power broadcasts to the base station. This also increases efficiency of bandwidth usage on the wide area wireless network itself, as both the requesting and responding user's communications are sent through the same high power broadcast. As the relative signal strength experienced by users changes, as users enter or leave the area, or as battery levels of cell phones decrease, the users' cell phones which provide connection to the wide area wireless network may also dynamically change.

In a second example, a plane may land at an airport, at which time potentially hundreds of cell phones are turned on simultaneously. Each of these cell phones will attempt to communicate with a base station at substantially the same time. This can cause very high levels of interference. However, if the present inventive concepts as described above are utilized, many users having the same service provider, for example, may establish local wireless connections with a select number of user's cell phones having the best signal strength and/or the most available local wireless connection channels, for example. In this way, the number of cell phones performing high power broadcasts to the same base station may be reduced, and the quality of the wide area wireless network may be increased for all users.

In a third example, a tour is being conducted in a canyon which may cause individuals at the bottom of the canyon to lose the signal to base stations available at the mouth of the canyon. By establishing a sequential chain of local wireless connections from one cell phone to another from the bottom of the canyon to individuals at the mouth of the canyon, mobile UE devices at the bottom of the canyon may be able to maintain communications with the wide area wireless network. In such an example, each device in the sequential chain of local wireless connections may be required to communicate with the previous device through one local wireless connection, while communicating with the next device through another local wireless connection.

A fourth example may include areas where wireless coverage is sporadic, such as rural areas or developing countries. Mobile base stations may be placed in vehicles, such as buses, rental cars, service vehicles and the like. Where an area has no stationary base stations supporting a wide area wireless network in the immediate vicinity, the mobile base station may act as a hub providing access to the wide area wireless network. Because each mobile base station may be in motion at any given time, the coverage area may move with the mobile base station. As the mobile base station changes location, it may attempt to dynamically connect to one or more base stations within its extended coverage area based on signal strength or service provider identity, for example. As the number of mobile base stations located in vehicles increases in a general area, the overall coverage of the wide area wireless network may expand to support the area without the immediate need for a service provider to install permanent, stationary base stations. As an added advantage, the mobile nature of the mobile base stations may allow wireless coverage to be provided in a particular area on short time schedules. Any mobile UE devices in the vicinity of the mobile base stations may establish and consolidate communications with the wide area wireless network through local wireless connections as described in any of the above examples, further expanding the coverage area of the network.

Thus, one or more implementations of the present inventive concepts may achieve reduced interference and increased efficiency of bandwidth usage in wide area wireless networks, increased battery lives of mobile UE devices and enlarged coverage areas, while simultaneously eliminating the expense to service providers of constructing additional stationary base stations in poor coverage or overloaded wireless networks.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A mobile base station for wireless communications with at least a first mobile user equipment (UE) device and at least a second mobile UE device, wherein the first mobile UE device is inside a coverage area of the mobile base station, wherein the second mobile UE device is outside the coverage area of the mobile base station, and wherein the second mobile UE device is wirelessly connected to the first mobile UE device and indirectly connected to the mobile base station vis-a-vis the first mobile UE device, the mobile base station comprising:
   a processor configured to:
      establish a wireless connection with one or more base stations supporting a wide area wireless network;
      establish a wireless connection with the first mobile UE device;
      select a base station from the one or more base stations having a service provider identity that matches a service provider identity of the first mobile UE device and the second mobile UE device;
      relay communications between the first mobile UE device and the second mobile UE device with the selected base station of the one or more base stations in the wide area wireless network; and
   a clock configured to provide a master timing signal for controlling wireless communication between the mobile base station and the first mobile UE and the second mobile UE on the wide area wireless network.

2. The mobile base station of claim 1, wherein the mobile base station is located in or on a moving mobile vehicle.

3. The mobile base station of claim 1, further comprising at least a third mobile UE device wirelessly connected to the second mobile UE and indirectly connected to the first mobile UE and the mobile base station.

4. A method for wireless communications in a wireless wide area network, the method comprising:
   establishing, using a processor of a mobile base station, a wireless connection with one or more base stations supporting a wide area wireless network, wherein each of the one or more base stations provides wireless communications using a different service provider;
   establishing, using the processor of the mobile base station, a wireless connection with at least a first mobile user equipment (UE) device located inside the coverage area of the mobile base station;
   establishing a wireless connection with a second mobile UE to the first mobile UE device, wherein the second mobile UE device is outside the coverage area of the mobile base station such that the second mobile UE device is indirectly connected to the mobile base station vis-à-vis the wireless connection to the first mobile UE device;
   selecting, using the processor of the mobile base station, a base station of the one or more base stations having a service provider identity that matches a service provider identity of the first mobile UE device and the second mobile UE device;

controlling wireless communication between the mobile base station and the first mobile UE and the second mobile UE on the wide area wireless network using a clock of the mobile base station configured to provide a master timing signal; and relaying, using the processor of the mobile base station, communications between the first mobile UE device and the second mobile UE device with the selected base station of the one or more base stations in the wide area wireless network.

5. The method of claim 4, wherein the connectivity information further includes one or more of a signal strength with one or more of the plurality of base stations.

6. A mobile base station for wireless communications with at least a first mobile user equipment (UE) device and at least a second mobile UE device, the mobile base station comprising:

a processor configured to:
  establish a wireless connection with one or more base stations supporting a wide area wireless network;
  establish a wireless connection with the first mobile UE device;
  select a base station from the one or more base stations having a service provider identity that matches a service provider identity of the first mobile UE device and the second mobile UE device;
  relay communications between the first mobile UE device and the second mobile UE device with the selected base station of the one or more base stations in the wide area wireless network; and a clock configured to provide a master timing signal for controlling wireless communication between the mobile base station and a first mobile UE and a second mobile UE on the wide area wireless network, wherein the first mobile UE device is inside a coverage area of the mobile base station, wherein the second mobile UE device is outside the coverage area of the mobile base station, and wherein the second mobile UE device is wirelessly connected to the first mobile UE device and indirectly connected to the mobile base station vis-a-vis the first mobile UE device.

\* \* \* \* \*